United States Patent
Sprik

(10) Patent No.: US 6,205,951 B1
(45) Date of Patent: Mar. 27, 2001

(54) LIVESTOCK FEEDER

(76) Inventor: Dale R. Sprik, 4111 Eight Mile Rd., Grand Rapids, MI (US) 49544

(*) Notice: Subject to any disclaimer, the term of this patent is extended or adjusted under 35 U.S.C. 154(b) by 0 days.

(21) Appl. No.: 09/415,527

(22) Filed: Oct. 8, 1999

(51) Int. Cl.$^7$ .................................................. A01K 1/10
(52) U.S. Cl. ................................................................ 119/60
(58) Field of Search ........................... 119/60, 502, 510, 119/522, 523, 524

(56) References Cited

U.S. PATENT DOCUMENTS

| | | | |
|---|---|---|---|
| 3,620,192 | 11/1971 | Taylor | 119/16 |
| 3,908,599 | * 9/1975 | Flocchini | 119/60 |
| 3,921,586 | * 11/1975 | Sweeney et al. | 119/60 |
| 3,995,594 | * 12/1976 | Rose | 119/60 |
| 4,445,460 | * 5/1984 | Stencil | 119/60 |
| 5,303,673 | * 4/1994 | Weelink | 119/60 |
| 5,336,035 | 8/1994 | Kuhns | 414/501 |
| 5,361,724 | 11/1994 | Kuhns | 119/60 |
| 5,433,172 | * 7/1995 | Weelink | 119/60 |
| 5,458,453 | 10/1995 | Kuhns | 414/786 |

OTHER PUBLICATIONS

Advertisement, Oct. 1995, E–Z Trail, Inc. 2 pages.

* cited by examiner

Primary Examiner—Thomas Price
(74) Attorney, Agent, or Firm—Robert J. Sayfie

(57) ABSTRACT

This invention is a livestock feeder comprising a top gate, a bottom gate, a center gate disposed between the top gate and the bottom gate, the top gate, the bottom gate, and the center gate define a gate system. The bottom gate can swing inward when the feed is eaten. Then after the livestock eat the feed when the gate is swung inward, the gate can be "reset" to the vertical position, and then the gate system can be moved closer to the feed. A device for horizontal movement disposed on the gate system whereby the gate system can move in a horizontal direction when movement of the device for horizontal movement is initiated. A device for initiating horizontal movement includes a hand crank. This invention can be in a covered environment similar to a pole barn. The sized can vary depending on the livestock herd, the property, and the feed. A sloped floor helps prevent waste accumulation where the livestock feed.

11 Claims, 3 Drawing Sheets

LIVESTOCK FEEDER

BACKGROUND OF THE INVENTION

1. Field of the Invention

The present invention relates to a mechanism for the efficient feeding of numerous livestock simultaneously. More particularly, the present invention relates to a feeder, which receives bales of hay to be disposed inside the feeder. One side of the feeder serves as a "feeding gate", which the livestock eat from by pulling hay or other similar feed through the gate with their mouths. As the hay is eaten, the gate system can be moved at the user's discretion, toward the opposing end, closer to the non-eaten feed, so the livestock can now access and ingest this feed.

Some feeder "gates" are essentially fixed and stationary. Therefore they must be inspected regularly to determine whether more feed needs to be deposited in said feeder. Other feeders have wheels so they can be moved around on the farm, but this limits their size, and therefore limits the capacity of feed, which they can hold, or "feeding capacity". Other feeders are baskets for receiving hay from a conventional bale chute, which also serve as a feeder. These are limited in size and therefore their storage capacity. Those in which the feeding gate moves, the feeding gate is usually moved by the force from the livestock who must push on the gate while feeding.

2. Description of the Related Art

What is needed therefore, is a feeder, which can store up to a full year of feed, with the option of doing so in a covered environment. Also, the floor may have a slope, or other proper drainage means to prevent the compilation of waste.

Numerous innovations for a livestock feeder have been provided in the prior art that are described as follows. Even though these innovations may be suitable for the specific individual purposes to which they address, they differ from the present invention as hereinafter contrasted.

U.S. Pat. No. 3,620,192 to Taylor discloses an, "animal actuated silo feeding gate", comprising a rectangular, enclosed feeding area, and a feeding gate moved by the livestock pushing against said gate. This patent, in column 1, lines 16–24, discusses various problems with moveable feeding gates. One of these problems is a tendency for the gate to cant or swing about a vertical axis due to a lateral shifting of the rollers, hampering inward movement of the gate. Another problem is vertical dislodgment, allowing the livestock to raise and move past the gate. These problems do not exist in the applicant's invention. Also the applicant's gate functions by allowing the livestock to become positioned relative to the feed, so feeding can be done with ease. The applicant also provides for a feeding gate, which can have open areas around the outer edges of the feeding gate so the big bulls can not prevent the smaller animals from feeding. U.S. Pat. No. 3,620,192 is comprised of sidewalls, which would allow the larger bulls to push the smaller livestock behind the larger bulls, out of the feeding area. U.S. Pat. No. 3,620,192's feeding gate is supported by wheels as described in column 2, lines 37–44. These wheels can be disadvantageous by actually preventing the movement of the feeding gate if there are any obstructions wedged between the rollers and the floor or ground. U.S. Pat. No. 3,620,192 has adjustable vertical bars (32). As admitted in the U.S. Pat. No. 3,620,192 patent, a gap of fourteen (14) inches may be proper for receiving the heads of larger bulls, but calves could walk right through or get stuck in such a gap. This could result in deadly consequences for any calves, if they encounter any gaps of that size. By implication, it seems as though U.S. Pat. No. 3,620,192 requires the livestock to push the feeding gate with their shoulders to move said feeding gate, thus their entire heads would be placed through the feeding gate. This could explain the necessity for such large spaces between said vertical bars. If all vertical bars were eight (8) inches apart as is mentioned in column 2 line 35, and their heads were required to fit through the vertical bars, the larger bulls could not eat. The applicant's invention has no such problems, which could result in death and great costs for the user. The applicant's preferred embodiment has openings that are about five and one-quarter (5.25) inches between the vertical members of the lower gate. Only the mouths of the livestock need to penetrate said openings. This allows efficient feeding for both bulls and calves. The applicant's invention does not use rollers, which eliminates the problems that rollers can encounter, such as small stones, and feed being wedged to prevent rolling.

U.S. Pat. No. 5,458,453 to Kuhns discloses a hay bale basket for accumulating and transporting hay bales. Due to size limitations, this can not be used to hold a substantial amount of feed. The closest argument that this is a feeder is that it may be possible for some animals to grab whatever feed is accessible, by said feed being exposed through the openings. Another distinction between this and the applicant's invention is that U.S. Pat. No. 5,458,453 has no means by which the animals can access the feed not adjacent to the openings in the side walls, either by having side walls which move, or by moving the feed to the side walls.

U.S. Pat. No. 5,361,724 to Kuhns discloses an, "expandable bale carrier and feeder". Column 2, lines 51–60 discuss the low profile of the invention. The applicant's invention allows for stacking of numerous bales of hay, upon bales of hay, "as high as the sky". Thus the holding volume of the applicant's invention is increased, and the requirement of refilling is decreased, relative to the U.S. Pat. No. 5,361,724. Column 3, lines 64–68 describe the aspect that the invention can accommodate a plurality of round hay bales supported on the bed in transverse side by side relation to each other when the side walls are in the first position. The applicant's invention can receive round, square, or any shape of hay bales. U.S. Pat. No. 5,361,724 in column 2, lines 12–17 provides that the feeder can accommodate at least two large round hay bales. U.S. Pat. No. 5,361,724 is limited by its size because if it were holding a large amount of hay, the weight would force the carrier to get stuck in the mud, possibly sink in the ground, get stuck and tip. The mud and slop generated at an outside, uncovered livestock feeding area can disable any vehicle. This mud, waste, and slop is generated by weather conditions, the stomping of the livestock, and the waste from the livestock. The applicant's invention can eliminate these problems by use of a sloped, flooring, in a covered environment.

U.S. Pat. No. 5,336,035 to Kuhns discloses a wheeled hay bale basket to accumulate and transport hay. This does not allow for a long term feeding capacity, and the efficient feeding area of applicant's invention.

U.S. Pat. No. 5,303,673 to Weelink discloses a displaceable feeding fence. In column 1, lines 35–39, the patent is limited to being used on the ground, unlike the applicant's invention, which has its own flooring system. U.S. Pat. No. 5,303,673 requires the livestock to stand on the floor plate to support the fence. If a large strong bull were to push the fence while a lighter calve were to be standing on the floor plate, the calve could be catapulted over the fence. Also, if the livestock on the right side of the fence were consuming more than those on the left side, the fence would rotate in a counter-clockwise direction, causing a plethora of problems, including locking of the gate, and possible breaking of the device.

Numerous innovations for a livestock feeder have been provided in the prior art that are adapted to be used. Even though these innovations may be suitable for the specific individual purposes to which they address, they would not be suitable for the purposes of the present invention as heretofore described.

OBJECTS AND ADVANTAGES

In accordance with the present invention, a livestock feeder is comprised of a means for horizontal movement which means may be two rails. A gate system which is comprised of, a top gate disposed above a center gate, said center gate disposed above the bottom gate. The bottom gate can articulate at a pivot point disposed somewhere between the bottom gate and the center gate, or on the bottom gate near the center gate. Once articulated, the bottom gate can be locked in position by a locking means, which may include a locking handle. The top gate and center gate can be one unitary gate.

All gates can move horizontally along the means for horizontal movement. The gates can be moved along the means for horizontal movement manually or with a crank, whereby a cable pulls the gates along the means for horizontal movement. The livestock feeder can also have a sloped floor, whereby the slope allows for waste and water to move away from the hay and livestock. The livestock feeder can also be free of side gates, which can impede feeding by allowing smaller livestock to be crushed, or pushed into any sidegates. The livestock feeder can be in an enclosure with a roof More particularly, it is an object of the present invention to provide a livestock feeder specifically adapted to enable the caretaker or herdsman to easily, conveniently and efficiently load feed, without specific stacking limitations.

In keeping with these objects, and with others which will become apparent hereinafter, one feature of the present invention resides, briefly stated, in that the livestock feeder permits the livestock a convenient method of eating.

When the livestock feeder is designed in accordance with the present invention, it provides the feature of long term feed storage, ease of loading, and waste runoff.

Another feature of the present invention is versatile construction, enabling the livestock feeder to be manufactured in a variety of lengths and widths to accommodate the various demands of the individual livestock herd, and feeding quantities and frequencies.

Another feature of the present invention is that it is simple to use, as the farmer or herdsman can merely use the crank to move the gates along the horizontal.

Yet another feature of the present invention is that of its versatile adaptability, enabling the livestock feeder to be used in connection with a variety of livestock, feed, and outdoor environments.

Still another feature of the present invention is that it may be manufactured from a number of different materials including, but not limited to: wood, metal, metal alloy, plastic, plastic composite, polymers, ceramics, and fiberglass.

Still yet another feature of the present invention is the simplicity of design, which would facilitate the manufacture and production of the livestock feeder.

Another feature of the present invention is that the gates can be designed with the vertical gate members of varying distances and widths depending on the livestock or feed.

Yet still another feature of the present invention is that the means for horizontal movement can be a rail upon which at least one wheel can ride.

The novel features which are considered characteristic for the invention are set forth in the appended claims. The invention itself, however, both as to its construction and is method of operation, together with additional objects and advantages thereof, will be best understood from the following description of the specific embodiments when read and understood in connection with the accompanying drawings.

DRAWING FIGURES

BRIEF LIST OF REFERENCE NUMERALS UTILIZED IN THE DRAWINGS

Figure 1:
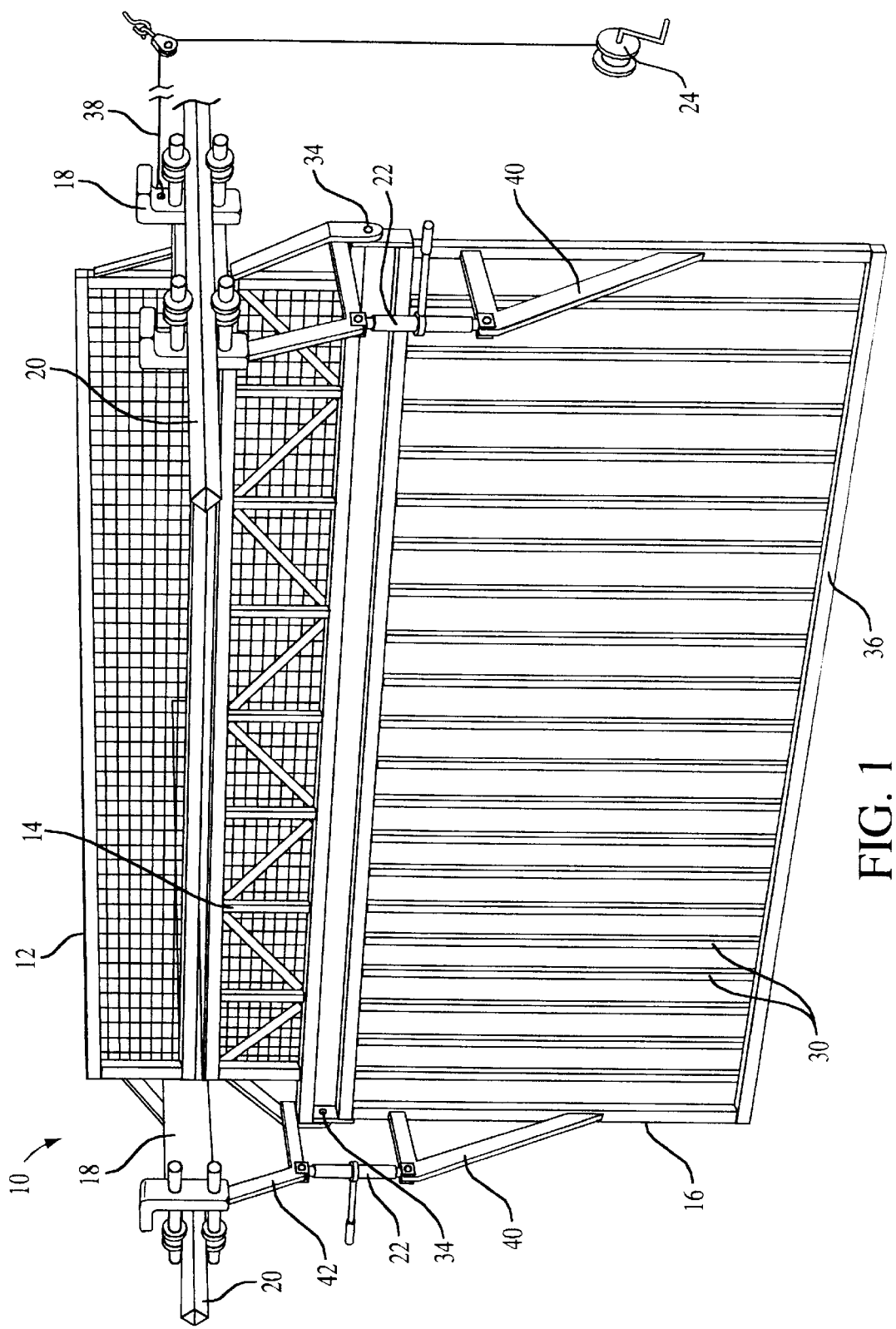
FIG. 1 is an isometric view of the invention, not including the optional roof, and not including the optional sloped flooring.

10—livestock feeder 10
12—top gate 12
14—center gate 14
16—bottom gate 16
18—means of horizontal movement 18
20—horizontal member 20
22—lower gate pivot lock 22
24—horizontal initiator 24
26—sloped floor 26
28—roof 28
30—bottom gate vertical bars 30
32—support posts 32
34—pivot point 34
36—bottom gate lower bar 36
38—cable 38
40—bottom gate lock support 40
42—center gate framing member 42

DESCRIPTION OF THE INVENTION

Figure 3:
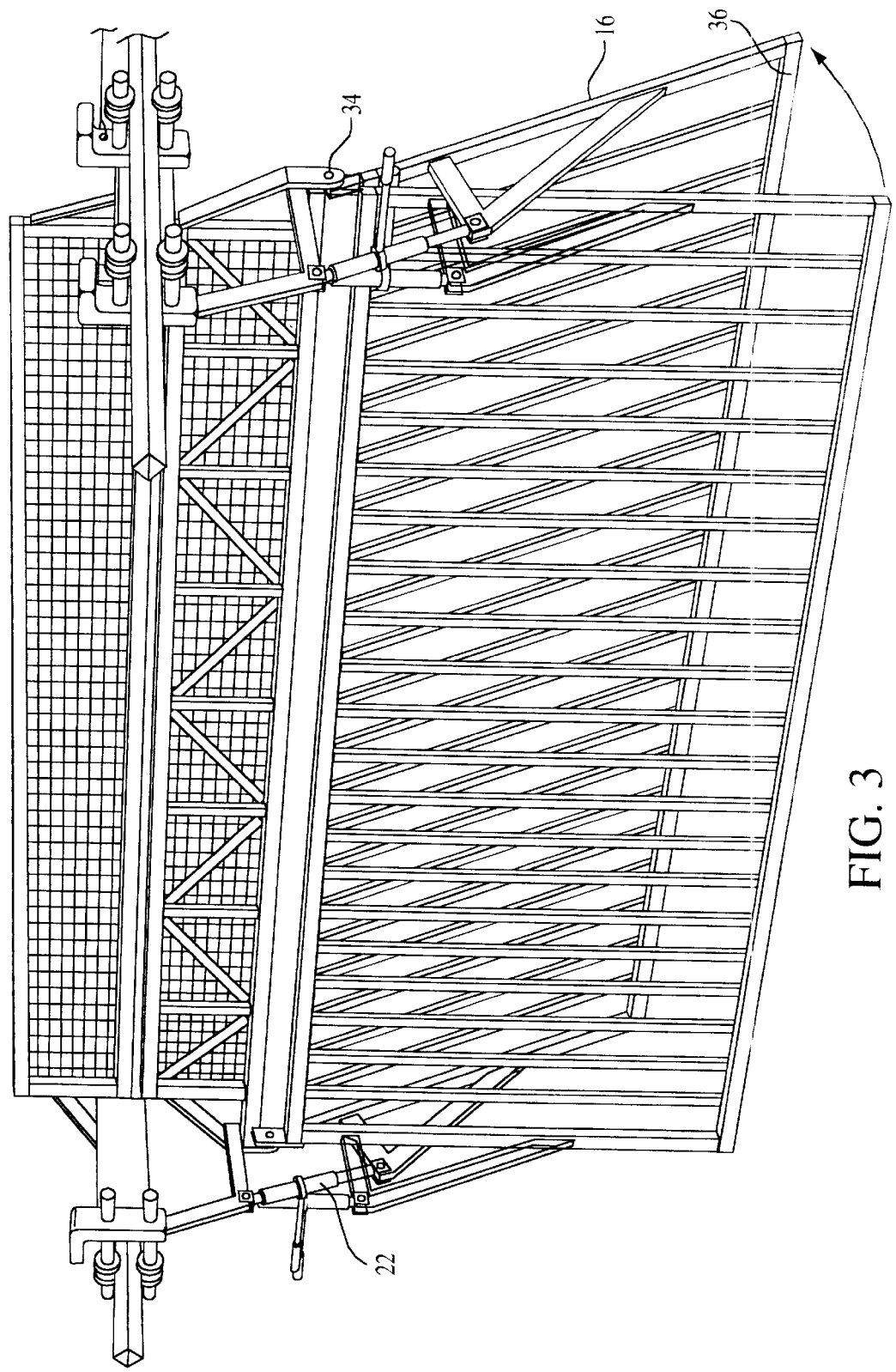
FIG. 3 is a view of the livestock feeder with the bottom gate shown in two (2) different positions so one can see the path in which it swings so fill a void created by eaten feed, which allows livestock to access feed near the floor.

A typical embodiment of the livestock feeder is disclosed in FIG. 1. FIG. 1 discloses an isometric view of the top gate (12) which is fastened to the center gate (14), the center gate (14) is pivotally connected to the lower gate (16) whereby the lower gate (16) can pivot about a pivot point (34), whereby the lower part (36) of the bottom gate (16) swings closer to the feed, or away from the feed so the livestock can easily access the feed, as in FIG. 3. The center gate (14) remains vertical, as the bottom gate (16) pivots, or as the top gate (12) may pivot. The pivoting about the pivot point (34) is accomplished by means of a lower gate pivot lock (22), whereby one can manually release the lower gate pivot lock (22) move the lower gate (16) so it pivots about the pivot point (34), then lock the lower gate pivot lock (22) so as to lock the bottom gate (16) in place. The lower gate pivot lock (22) can be disposed between a bottom gate lock support (40) and a center gate framing member (42). The gate system which is comprised of the top gate (12), center gate (14) and bottom gate (16) can be moved horizontally by means of horizontal movement (18). The bottom gate (16) can be comprised of a plurality of bottom gate vertical bars (30) to define openings in which the livestock can place their mouths to eat. The means of horizontal movement (18) shown are two roller mechanisms having four wheels each, two wheels on each side of the roller mechanism, which roll on a horizontal member (20). The means of horizontal movement (18) is initiated by a horizontal initiator (24). The horizontal initiator (24) shown is a common crank with a cable (38), said cable (38) being fastened to the means for horizontal movement (18). The gate system can be moved horizontally regardless of the position of the bottom gate (16), i.e. either as shown in FIG. 1, or FIG. 3.

Figure 2:
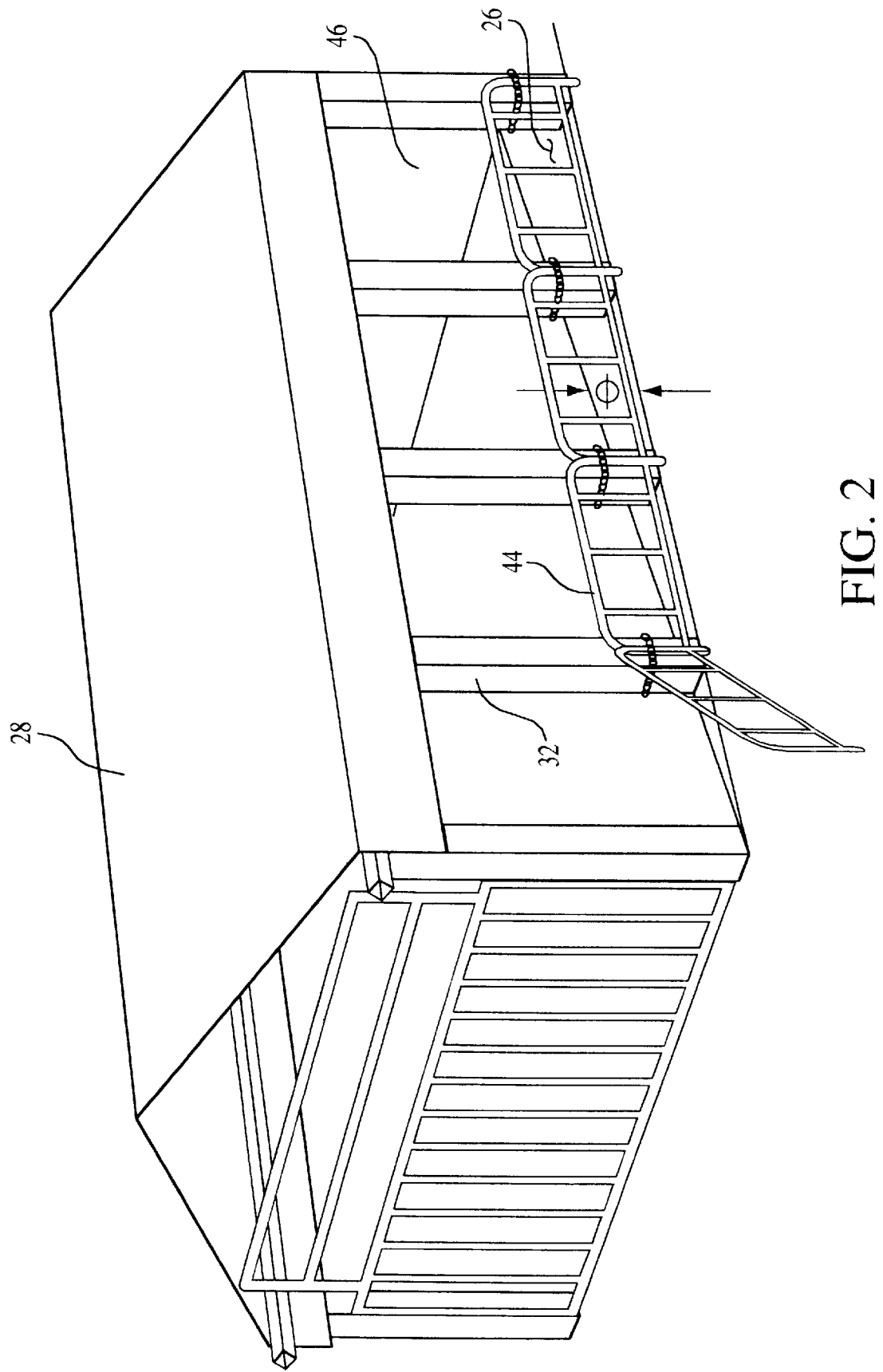
FIG. 2 is a view showing the invention with the roof, and sloped flooring.

The gate system and sidegates (44) define a feeding area. The gate system shown in FIG. 2 is disposed at what is defined as the front of the feeding area, and the means for horizontal movement (18) can move the gate system to the opposing end, called the back of the feeding area (46). The feed is placed in the feeding area from the back of the feeding area (46) manually or by tractors. At the time the feed is placed in the feeding area, it is best to have the gate system positioned as far from the back of the feeding area (46) as possible so as to maximize the feeding area.

Next, as the livestock first eat the feed near the floor (26), a void is created near the floor (26), and near the bottom gate lower bar (36) as the bottom gate (16) starts out in the essentially vertical position as shown in FIG. 1. Now the user can unlock the bottom gate (16) by releasing the bottom gate pivot lock (22), position the bottom gate lower bar (36) closer to the uneaten feed, and then secure the bottom gate pivot lock (22), locking the bottom gate (16) in position, as shown in FIG. 3. Now the livestock can eat the feed, which is adjacent to the bottom gate (16). As they eat this feed, the feed (including hay bales) above will drop down, allowing the livestock to access this new dropped feed. Once this is eaten, the bottom gate pivot lock (22) can be released, to allow the user to move the bottom gate (16) to position the bottom gate (16) in the essentially vertical position as shown in FIG. 1, and then the user can move the gate system closer to the uneaten feed, in the direction of the back of the feeding area (46).

FIG. 2 discloses the livestock feeder with a roof (28), and a floor (26). The floor (26) can be sloped at angle theta (θ) as opposed to being level with the horizontal, as shown, so any waste runs away from the feed and livestock. A plurality of sidegates (44) enclose the feed so the livestock can not simply go around to the side of the feed. The sidegates (44) can be opened as shown in FIG. 2 once the gate system is moved inward. The opening of the sidegates prevents the livestock from being crushed. Particularly, the smaller livestock can be crushed by the larger bulls when the bulls force their way in to the bottom gate (16) to feed. The opening of the sidegates (44) can prevent that.

FIG. 3 discloses the bottom gate (16) after it is swung inward and locked in place. The bottom gate (16) is locked in place by the lower gate pivot lock (22). When the bottom gate (16) is shown in an essentially vertical position as in FIG. 1, the livestock will eat the feed near the bottom, leaving a void. The void left by the eaten feed is now closed by moving the bottom gate (16) and bottom gate lower bar (36) and bottom gate vertical bars (30) closer to the existing (non-eaten) feed. Now with the bottom gate (16), the bottom gate lower bar (36), and the bottom gate vertical bars (30) closer to the feed, the livestock can place their mouths closer to the feed and eat and nourish themselves.

CONCLUSIONS, RAMIFICATIONS AND SCOPE OF THE INVENTION

It will be understood that each of the elements described above, or two or more together, may also find a useful application in other types of constructions differing from the type described above.

While the invention has been illustrated and described as embodied in a livestock feeder, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A livestock feeder comprising:

a) a top gate, a bottom gate, a center gate disposed between said top gate and said bottom gate, said top gate, said bottom gate, and said center gate define a gate system;

b) a means for horizontal movement disposed on the gate system whereby the gate system can move in a horizontal direction when movement of the means for horizontal movement is initiated; and c) a means for initiating horizontal movement.

2. The livestock feeder of claim 1 wherein the means for horizontal movement is a roller mechanism, which rolls on a horizontal member.

3. The livestock feeder of claim 1 wherein the means for initiation horizontal movement is a crank and cable, whereby the cable is attached to the roller mechanism.

4. The livestock feeder of claim 1 wherein the bottom gate can pivot about a pivot point and locked in place by a lower gate pivot lock.

5. The livestock feeder of claim 4 wherein a bottom gate lock support is disposed on said bottom gate, a center gate support is disposed on said center gate, and a bottom gate pivot lock is disposed between said bottom gate lock support and said center gate support.

6. The livestock feeder as described in claim 1, wherein the livestock feeder is manufactured from a material selected from a group of materials consisting of wood, metal, metal alloy, plastic, plastic composite, fiberglass, ceramic, and epoxy.

7. The livestock feeder as described in claim 1, wherein the livestock feeder is manufactured in different lengths and widths.

8. The livestock feeder as described in claim 1, wherein the gate system is constructed to be used in conjunction with existing poll barn-like structures.

9. The livestock feeder as described in claim 1, wherein the bottom gate has vertical members, whereby bison can place their mouths near said vertical members and pull out hay with their mouths.

10. The livestock feeder as described in claim 9 wherein said vertical members have 5.25-inch openings separating said vertical members.

11. The livestock feeder as described in claim 1 wherein said top gate, center gate, and bottom gate can each have a variety of sizes.

* * * * *